United States Patent Office 3,692,722
Patented Sept. 19, 1972

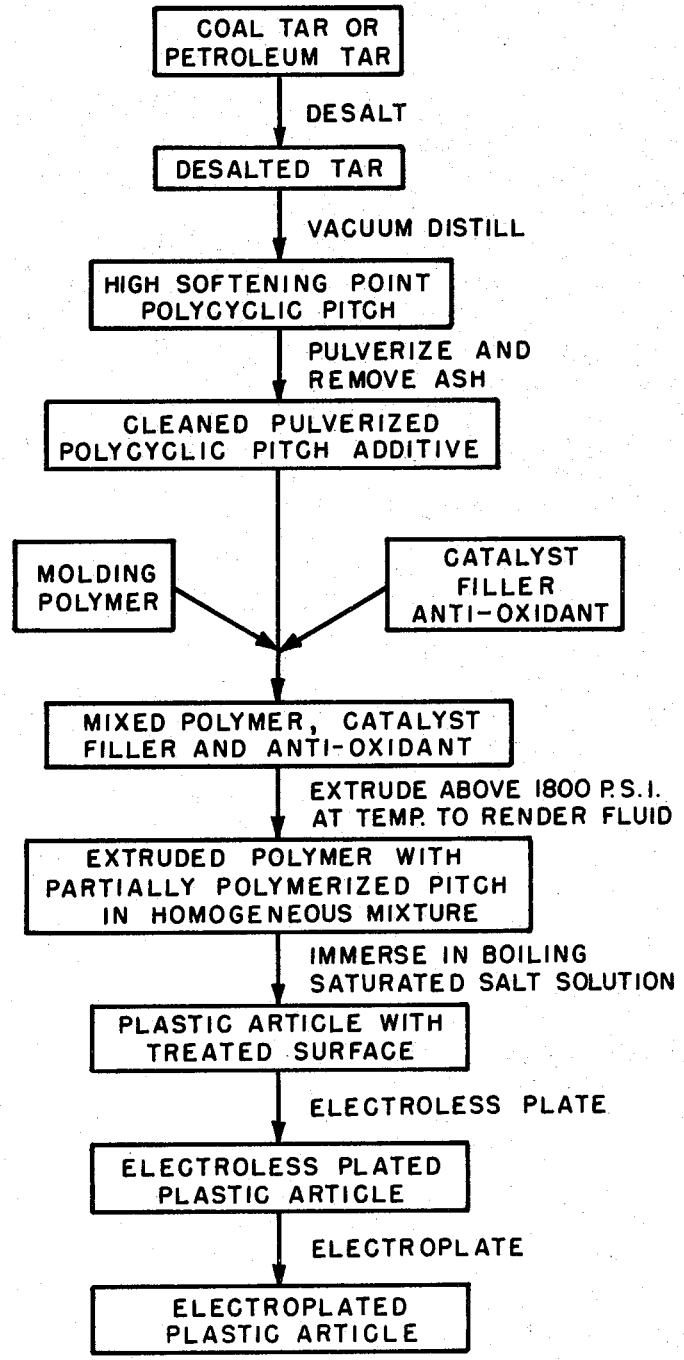

3,692,722
POLYMERIC COMPOSITIONS AND METHODS
OF TREATING
Edgar W. Clarke, 121 Fairmont Ave.,
Laurel Springs, N.J. 08021
Continuation-in-part of application Ser. No. 862,523,
Sept. 30, 1969. This application Feb. 20, 1970,
Ser. No. 13,011
Int. Cl. C08g 51/52; C08f 45/52; C08h 13/08
U.S. Cl. 260—28    18 Claims

ABSTRACT OF THE DISCLOSURE

An organic polymer is prepared incorporating a novel polymerized pitch additive which facilitates the homogeneous blending and molding of dissimilar polymers, the inclusion of relatively large proportions of various fillers such as powdered metals, and the electroplating of the molded product.

CROSS-REFERENCE TO RELATED APPLICATION

This application is a continuation-in-part of my application Ser. No. 862,523, "Plastic Formulations," filed Sept. 30, 1969, now abandoned.

BACKGROUND OF THE INVENTION

Polymers or synthetic plastics having a wide range of physical and chemical characteristics have been developed, beginning with natural rubber, hard rubber, celluloid and bakelite and now including such different materials as the polystyrenes, the polyurethanes, the polyamides, the polyethylenes, the polybutadienes and the polyacrylonitriles, for example. These and the other plastic compositions commercially available exhibit a wide variety of physical and chemical characteristics and also differ markedly in their cost. An obvious expedient for the purpose of reducing such cost has been to incorporate various inexpensive fillers into the plastic composition, but the amount of filler which may thus be employed is definitely limited since employment of too large an amount will degrade the desirable characteristics of the plastic. It has also been common to introduce relatively small amounts of various modifying agents for the purpose of enhancing certain of the desired characteristics of the plastic composition, and efforts have been made to mix different types of polymers together to obtain compositions having the best characteristics of each. While some polymers may thus be intermixed satisfactorily (e.g. polymers of acrylonitrile, butadiene and styrene), in most cases the various polymers have been found to be substantially incompatible and do not blend together in a manner providing a sufficiently homogeneous new product. Similarly, many of the desirable fillers or modifying agents cannot be satisfactorily incorporated into such polymers in the amounts desired for the intended purpose.

Asphalt and pitch, and particularly the polymerized asphaltenes, are known and employed as fillers or extenders for certain polymers, especially the synthetic and natural rubbers. Such asphaltic fillers and extenders are ordinarily obtained by solvent fractionation processes and have relatively low softening points. In substantial amounts they tend to degrade the physical properties of the plastic and can accordingly be utilized in only relatively small amounts. Since they are quite inexpensive, however, they would be ideal extenders if they could be employed in larger proportions without deleterious effects. As much as 50% by weight of asphalt may be incorporated in polyethylene to produce a black film suitable for use as a garden mulch, for example, but such materials are not suitable for most uses where better physical properties are required.

Various molded plastic articles are subjected to operating conditions where fairly high temperatures are generated, and a limiting factor on their usefulness has frequently been the relatively low conductivity of such plastics which prevents dissipation of such heat and causes premature breakdown of the plastic composition. It has been recognized that it would be desirable to incorporate quite large quantities of powdered metals in the plastic compositions, both for this reason and for various other reasons such as to increase the weight and density of the material, but this has not ordinarily proved feasible.

With the development of printed circuits, miniaturized circuits, etc. there has been an increasing demand for molded plastic articles capable of being electroplated, and certain plastic articles and methods of plating have been developed. Thus, for example, the ABS thermoplastic polymers have been produced employing three monomers, acrylonitrile, butadiene and styrene, and a fourth monomer such as alpha methyl styrene can be used to obtain greater resistance to heat, if desired. An ABS modifier can be made which may be blended with polyvinyl chloride. See, for example, Modern Plastics Encyclopedia, October 1968, volume 45: No. 14A, McGraw-Hill, Inc., pp. 118–123, and 958–962. Certain of such compositions may be adapted for electroplating. A very large number of plastic compositions, however, have proved extremely difficult or impossible to plate by previously known methods.

SUMMARY OF THE INVENTION

It is, accordingly, an important object of the present invention to improve the characteristics of plastic compositions and especially molding resins by enabling the mixing of normally incompatible polymers together in a manner to combine their desirable attributes.

Another object is to modify thermoplastic and thermosetting molding compositions to enable incorporation of larger amounts of inexpensive fillers, without substantially detracting from the desirable qualities of such compositions.

Still another object is to modify polymeric compositions to make feasible uniform incorporation of larger amounts of finely powdered metals to increase weight and density as well as to enhance thermal and electrical conductivity.

A further object is to modify polymeric compositions in a manner to facilitate electroplating of the same.

A still further object is to provide a novel prepared pitch additive suitable for incorporation in polymeric compositions to improve the properties of the latter. Other objects of the invention will appear as the description proceeds.

I prepare a plastics material comprising an organic polymer or molding resin (e.g. nylon) having intimately incorporated therein in homogeneous admixture a material which is principally comprised of complex fused polycyclic hydrocarbons such as polynuclear aromatics preferably derived from a specially prepared pitch which has been treated with a catalyst such as cobalt naphthenate. Such pitch will preferably have been preliminarily desalted and prepared to have a softening temperature (as determined by the A.S.T.M. Ring-and-Ball Standard Method of Test No. E–28) of more than 320° F. and desirably between 360° F. and about 420° F. Such prepared pitch, after treatment with such catalyst, appears itself to be at least somewhat polymerized and evinces a very low interfacial tension in the liquid phase relative to the resin in which it is incorporated, on the order of 20 dynes/cm. or less. Such complex material may be derived from coal tar or oil tar which has been desalted by treatment with a large quantity of water and then vacuum distilled at as high a temperature as feasible without pyrolytic decomposition, followed by rapid cooling to avoid oxidation. The resultant solid desalted pitch has a softening point (as determined by such A.S.T.M. ring and ball method) of between 320° F. and about 420° F., ordinarily desirably about 360° F. Whenever such A.S.T.M. ring and ball test method is referred to herein it will be understood that A.S.T.M. Test No. E–28 is employed.

The pitch is then pulverized until it will pass through a 20–80 mesh screen and the pulverized material air elutriated to remove the pitch while leaving behind the heavier ash residue, ordinarily about 10–15% by weight. The cleaned pulverized pitch may then be mixed in a heated extruder with a molding polymer and a suitable polymerization catalyst such as cobalt naphthenate. The pulverized pitch is thereby apparently partially polymerized in compatible homogeneous mixture with such polymer and the mixture is extruded and solidified in desired shape or formed into molding pellets, for example.

From about 10% to about 25% by weight of the total composition (including fillers, etc.) may be comprised of such semi-polymerized pitch and good results are obtained when as little as 3% to 5% by weight of such polymerized pitch is employed if sufficient finely divided carbon is also incorporated in the mixture to constitute a total of 10% by weight of the entire mixture in conjunction with such semi-polymerized pitch. The plastic composition as thus produced may, for example, also contain 30% by weight of aluminum oxide, or 50% by weight of powdered metal, or 20% by weight of finely divided carbon. When such large amount of powdered metal is incorporated in the mixture, the specific gravity of the latter is very much increased as well as the thermal and electrical conductivity. Such latter properties are of great importance when heat dissipation or the passage of electric current is involved.

I have found that when the foregoing mixture is subjected to a plastic molding operation, as in an injection molding machine, the resultant molded article tends to have a very thin superficial layer comprising a relatively high percentage of the now semi-polymerized pitch constituent, and this feature much enhances the susceptibility of the article to electroplating. For this purpose, I first repeatedly immerse the article in a boiling, saturated inorganic salt solution and then cool and wash such article. A small amount of the salt is thereby drawn into the surface pores of the article in very finely divided form, and the article will then be subjected to electroless plating in the usual manner to produce an extremely thin nickel-copper deposit thereon. The article may then be electroplated without further difficulty. This novel technique enabled me successfully to electroplate a wide variety of polymeric materials including such "structural" plastics as the polyamides (nyon) which heretofore have been extremely difficult or impossible to electroplate.

BRIEF DESCRIPTION OF THE DRAWING

The annexed drawing comprises an annotated flow diagram illustrative of a preferred procedure for preparing a molded plastic article for electroplating in accordance with my invention. Various modifications and alternatives are set forth more in detail in the following description of the invention.

DESCRIPTION OF THE PREFERRED EMBODIMENTS

Preparation of the additive

As indicated above, the usual asphalts, asphaltenes, and coal tar and oil tar pitches have been found seriously to degrade the quality of synthetic plastic compositions when incorporated therein in consequential amounts. As explained below, however, I process such materials in a novel manner to provide an addition agent for organic polymeric compositions which can be incorporated in such polymeric compositions in substantial amounts without appreciably degrading the physical characteristics of the same and which at the same time afford certain novel and highly advantageous properties.

Generally speaking, I employ as a starting material a tar or pitch derived from the high temperature pyrolysis of fossil hydrocarbons, although certain naturally occurring tars and pitches may also be employed. The latter are relatively insignificant from a commercial point of view. This starting material will normally contain from about 8% to about 100% by weight of asphaltenes.

Among the source materials which may be utilized in the preparation of my novel additives are brown coal, lignite, bituminous coal, anthracite coal, and anthracite fines which may be charged to coal stills such as horizonal or vertical retorts and coke ovens to produce an inexpensive tar. Low temperature coal gasification tars and conventional air-blown asphalts have been found to be relatively unsatisfactory. Other suitable source materials include oil tar, particularly petroleum tar derived from vacuum tower bottoms, visbreaker bottoms, delayed cokers, catalytic cracker slurry oil tar, catalytic reformers, duo-sol extraction units, propane deasphalting units, and ethane cracking heaters. Tar from the Wulff acetylene process may also be utilized. Other sources include shale oil recovery tars, Trinidad asphalt, and gilsonite.

As an illustrative and preferred example, liquid crude coal tar may fire be mixed for several minutes with an equal quantity of water to dissolve and dilute any halogen salts present, particularly sodium chloride and ammonium chloride, and the dilute solution drained or centrifuged away to leave the tar substantially free of such halides, and more particularly chloride, salts. I have found that it is highly desirable thus to substantially remove any such salt content inasmuch as the latter ordinarily has a markedly deleterious effect upon the physical characteristics of the plastics in which the eventual pitch material may subsequently be incorporated as an inert and inexpensive filler or additive.

Such de-salting operation may, however, not always be required, as when tars are utilized from catalytic crackers, catalytic reformers, and thermal reformers where the oils processed thereby have already been desalted. The objective is to obtain a tar preferably containing less than ten pounds of chlorides (or other halogen salt) per one thousand barrels of tar, and in any event less than fifty pounds of chlorides (or other halide salt) per one thousand barrels of tar. The tar is ordinarily a viscous liquid but may be a semi-solid or solid material. To ensure liquidity of the tar and enhance solution of the salt, the tar and water are heated and mixed and emulsified at about 200° F., and higher temperatures may be employed under pressure if a normally relatively hard solid tar is to be treated. A volume of water at least equal to one-third the volume of the tar is thus employed, and preferably at least an equal volume of water. The mixture is charged to a 50,000 gallon settling tank, the lower tar-containing portion of which is heated to about 230° F., and the liquid tar is continuously withdrawn from the upper portion of the tank. The product is a tar containing a substantial volume of asphaltenes and which is substantially halide free.

As indicated in the accompanying flow diagram, such desalted tar will then be vacuum distilled at about 10 millimeters of mercury absolute and at as high a temperature as is feasible without producing appreciable cracking. Standard direct-fired distillation equipment of the batch or continuous type may be employed, with steam being introduced at the bottom to stir and strip the volatiles. The pitch residue left in the still should have a softening point not below 320° F. (by the ASTM ring and ball method), desirably of at least 340° F., and preferably of at least 360° F. It is difficult to obtain a softening point much above 360° F. without producing undesirable coking. Such relatively high softening point is an important element of the present invention, and the asphalts and pitches of which I am aware of having been previously used as fillers in plastics compositions have been of substantially lower softening points. The problems then arise of the removal of the residual pitch from the still and the prevention of coke formation if such pitch is held at a high temperature (e.g. 760° F., depending on the tar used) in the still for any extended period of time. I have found that a suitable pitch of 360° F. softening point (by the ASTM ring and ball method) can be produced by rapid batch vacuum distillation. If such pitch is heated to a sufficiently high temperature to cause it to flow from the still, it tends to form an excessive amount of coke-like particles, but if instead it is pressurized as by means of inert flue gases, nitrogen or steam following such vacuum distillation it can be quickly forced out of the still onto a rotating water cooled drum where it is quickly cooled in a non-oxidizing atmosphere, and flaked.

As an alternative procedure, following desalting of the tar it may be dissolved or suspended in a boiling paraffinic solvent such as pentane, hexane, or Udex-raffiate and the solution then cooled to precipitate or separate the high softening point pitch (having a softening point of at least 320° F. by the ASTM ring and ball method). Centrifuging or filtration may be utilized to facilitate such separation.

By either method, I thus obtain a prepared pitch having a high asphaltene content and an exceptionally high softening point, and which is substantially halogen-free. Asphaltenes are essentially polynuclear aromatics soluble in an equal volume of carbon bisulphide and relatively only slightly soluble in carbon tetrachloride (being substantially insoluble in an equal volume of carbon tetrachloride). They are insoluble in straight chain paraffinic hydrocarbons.

The solidified pitch is then desirably pulverized to 10 to 80 mesh size or finer, and preferably at least to 20 to 80 mesh or finer, as in a hammer mill, whereupon it is desirably fed into a standard air classifier to separate the lighter pitch particles from the heavier ash residue, normally about 10–15% by weight. There are frequently certain sulphur compounds contained in such ash and these are desirably thus substantially removed from the pitch. The prepared pitch thus has an ash content of less than 5% by weight (and usually considerably less), as measured by ASTM Method D–482–46. Such a classifier may comprise a column with a blower introducing air at the bottom, the essentially ash-free pitch particles being delivered out the top and the ash residue being discharged at the bottom.

A polymerization initiator, such as cobalt naphthenate, may be mixed with the pitch during the pulverization operation but preferably subsequent to the air-elutriation operation. Indeed, superior results are obtained when the cobalt naphthenate is mixed with the cleansed and pulverized pitch when the latter is introduced into an extruder together with one or more thermoplastic molding resins or polymers. Preferably, however, a tumbler mixer or a Baker-Perkins Sigma blade mixer will be charged with the prepared pulverized pitch, the polymerization catalyst (cobalt naphthenate), plastic polymer pellets (e.g. nylon), a filler (e.g. bentonite and a finely powdered metal), and an anti-oxidant (e.g., about five to ten parts per million, by weight of the pitch, of an anti-oxidant such as tocopherol) and the contents of such mixer heated to approximately 200° F. to soften the pitch to a somewhat tacky condition. Other known anti-oxidants such as "Sustane" (butylated hydroxy anisole) may also be employed. Depending on the plastic employed, it may likewise be somewhat softened. The tumbling action of the mixer serves to coat the plastic pellets with the other ingredients of the mixture so that a uniform composition is obtained in the subsequent extruding or other molding operation.

The extruder will desirably be operated at a pressure above 1800 p.s.i. and desirably about 2200 p.s.i., and at a temperature sufficiently high to render the mixture fluid at such pressure, usually at least 400° F. and preferably above 500° F. This operation apparently effects a degree of polymerization of the prepared pitch and is believed to cause a certain amount of cross-linking to the plastic polymer. The polymerized pitch thereby produced comprises a substantially halide-free complex polymerized aromatic composition having a very low interfacial tension with the admixed resin or polymer (ordinarily below 20 dynes/cm. with nylon 6/6, for example) which forms a highly compatible and essentially homogeneous mixture with the latter. Such extruded homogeneous mixture may thus be shaped into rods or plates or may be cut or otherwise formed into molding pellets suitable for subsequent employment in a conventional injection molding machine, or such extruded material may be directly introduced into an automatic injection molding machine. A plurality of different and normally incompatible polymers may thus be introduced into the extruder and rendered compatible and homogeneous by the admixture of my new prepared pitch.

While the prepared pitch and cobalt naphthenate will ordinarily be thus admixed with the resin or polymer as above described, it is also sometimes feasible to mix the pitch and cobalt naphthenate with the reactant constituents of the plastic prior to polymerization of such constituents, such as methyl methacrylate. Thus, for example, a polymethylmethacrylate containing my new prepared pitch may be obtained by either procedure.

Rather than thus heating and extruding the mixture to form an extruded product or molding pellets for use in a further transfer or compression molding operation, it is also possible to directly mold such mixture in a transfer or compression molding operation but superior results are obtained by use of the extruder as described.

Heating to approximately 500° F. or above appears to result in the production of a substantial quantity of free radicals in the polymerized pitch effective thus to cross link to the plastic polymer whereas there is relatively little free radical activity at lower temperatures. An intimate mechanical mixture of the polymerized pitch is obtained due to the low interfacial tension between the fluid partially polymerized pitch and the fluid plastic polymer at the operating temperature, and the extruder die will be cooled to deliver a solid product. Thus, the extruder will normally have a first zone where the ingredients are at a temperature below the melting point of the plastic polymer, a second zone at a temperature above the melting point of the plastic polymer and preferably above 500° F. for best results (unless the plastic polymer tends to become degraded by such temperature, requiring employment of a somewhat lower temperature), the ingredients passing through such zone in about 2 to about 7 seconds, and a cooling zone at the extruder die effective to cool the extruded mixture substantially below 500° F. Apparently the polymerized pitch becomes a continuous phase which encapsulates the individual grains of the filler (e.g. metal powder) and the plastic polymer, and a solid solution of the polymerized pitch and plastic polymer may be formed in the end product. In any event, a highly uniform homogeneous mixture is obtained with such plastic polymer or polymers.

A wide variety of fillers may be employed, typical examples being bentonite, kaolin, attapulgite, whiting, silica flour, alumina powder, metal powders, iron oxide, chopped glass fiber, No. 304 stainless steel powder, screened mill scale, and the dust from Cottrell precipitators employed with basic oxygen furnaces. The powdered metals should normally be 100 mesh or finer, although powdered copper may be 20 mesh. When using such precipitator dust (largely finely divided $Fe_2O_3$) it is found that the extruded or molded product has much increased compressive strength and is easier to machine. Furthermore, a better bond is achieved with subsequent metal plating. Certain metal powders such as lead powder serve to increase the anti-friction effect. Semi-conductors may be produced with employment of powdered aluminum oxide or various powdered metals.

The compounded plastic of this invention has been found to bond exceptionally well to ceramic articles such as ceramic pistons and plungers used in pumps handling acids or slurries where there is a problem of corrosion or excessive wear; all components of such pump may be of my new compounded plastic material except for the wear surface elements. In addition to the excellent bonding, my new material absorbs the shocks which might otherwise damage the ceramic elements.

While other catalysts for the prepared pitch may be utilized such as barium naphthenate, calcium naphthenate, strontium naphthenate, and certain peroxides, the cobalt naphthenate is very much preferred. The peroxides are not very suitable for commercial use in view of the safety precautions required in their handling.

The high softening point prepared pitch which has been partially polymerized in the presence of a catalyst such as cobalt naphthenate may be termed a "carboid" but probably more properly a "carbene," depending upon the solubility characteristics thereof. Rather than to adopt such a name I prefer simply to call this new material a partially polymerized high softening point polycyclic hydrocarbon pitch.

Plastics compositions

When the previously known asphaltenes have been experimentally blended with plastics, there may be some slight improvement in certain physical properties and considerable improvement in electronic properties. On the other hand, the resultant plastics formulations were found to be basically unstable, the asphaltenes gradually oxidizing and the plastic deteriorating in physical properties. The oxidized asphaltenes could then be leached out by heating the plastics in lubricating oil.

In contrast thereto, when employing plastics formulations produced in accordance with the present invention by incorporation of my new prepared pitch therein, such formulations show distinctly improved physical properties which do not deteriorate with the passage of time. Even when samples are heated to 210° F. in lubricating oil for several months, no leaching is apparent.

In the past, it has been possible to dry blend certain powdered thermoplastic resins with viscous liquids or low melting solids known as plasticizers, and with limited quantities of inert solids known as fillers, but in only a very few cases has it been feasible to blend different thermoplastic resins together without seriously impairing or degrading the physical properties of the final extruded or otherwise molded plastics. This is apparently due to the fact that such molding resins normally have very high interfacial tensions between each other when in the liquid state at molding temperatures and hence do not mix well but instead form mutually incompatible agglomerations with resultant poor physical characteristics. While the interfacial tensions of thermoplastic resin mixtures at molding temperatures are frequently over 200 dynes per centimeter, the interfacial tension between my new prepared semi-polymerized pitch and the plastics in the liquid or fluid state is apparently below 30 dynes per centimeter as determined by the Du Nouy tensiometer and ordinarily below 20 dynes per centimeter. Accordingly, my new polymerized pitch when present even in minor volumetric proportions forms a continuous phase and essentially homogenizes larger volumes of otherwise mutually insoluble thermoplastic resins. Then, in the final extruded or injection molded product, the several components are all very intimately dispersed in solid solution or very fine physical mixture so that excellent physical and electronic properties result. I am thus enabled to provide a relatively inexpensvie thermoplastic resin composition evidencing the desirable characteristics of the component resins of the formulation and generally more satisfactory than the relatively expensvie copolymers which have been developed for somewhat similar purposes.

Ordinarily, my new prepared pitch may be present in the plastics formulation in an amount of from about 3% to about 30% by weight of the total composition (including fillers, etc.). If less than 10% by weight of my new prepared pitch is thus employed, then sufficient finely divided carbon should also be incorporated in the mixture to make a total of 10% by weight when taken with the prepared pitch. It is usually preferred not to employ more than 20% by weight of my new prepared pitch in the total composition as some degradation of the physical characteristics may occur above this point. Particularly suitable thermoplastic polymers for employment with my invention include nylon (polyamide resins), polycarbonates, polytetrafluoroethylene, and mixtures of these with each other or with other thermoplastic polymers. Other suitable polymers include polyethylene, polypropylene, and polyvinylchloride. Plasticizers such as the polyethylene glycols sold by Union Carbide Corporation under the trademark "Carbowax" and the vinyl acetate-ethylene copolymers sold by the Du Pont Company under the trademark "Elvax" may also be included, preferably in an amount of from about 2% to about 7% by weight of the total composition. My new prepared pitch may similarly be incorporated with thermosetting molding resins such as the epoxy resins (e.g. "Epon" 828 from Miller-Stephenson Chemical Co.) and the phenolformaldehyde resins (e.g. "Durez" resins); in the case of the epoxy resins it is feasible thus to incorporate up to about 50% of my new prepared pitch, by weight, but only up to about 15% in the case of the phenolic resins.

A particulate solid inert inorganic filler may also be included, such as clay (e.g. bentonite) in an amount of from about 5% to about 30% by weight of the total composition. Similarly, a substantial amount of a powdered metal may be included, preferably from about 40% to about 55% by weight of the total composition. Especially satisfactory powdered metals are powdered copper and stainless steel. For some purposes, the proportion of powdered metal thus incorporated may preferably be such as to provide the composition with a thermal conductivity of at least 8 B.t.u. per hour per degree Fahrenheit per square foot area per inch of thickness. Such powdered metals are particularly useful when incorporated in a thermoplastic polymer such as tetrafluoroethylene, and from about 2% to about 8% by weight of tetrafluoroethylene may desirably be incorporated in the plastics composition if not otherwise present. It will thus be seen that a wide variety of different types of plastics may be blended together in accordance with my invention together with plasticizers, finely dispersed fillers, powdered metals and the like to achieve a variety of different desired physical properties not previously available, or at least not available in the same combinations in the prior art. By thus incorporating large quantities of powdered metals into extruded and injected molded thermoplastics, it is possible to combine superior toughness, wear resistance and high thermal conductivity with outstanding electronic properties at a low cost. In the past, when powdered metals were incorporated into thermoplastic resins (without the employment of my new prepared pitch ingredient) the surfaces of the molded articles were found to wear around the metal particles which then fell out and further gouged and eroded such surfaces. Consequently, plastic gears previously produced including a substantial powdered metal content tended to fail rather promptly under heavy loading. In contrast, thermoplastic compositions incorporating powdered metals and the polymerized pitch ingredient of this invention produce molded articles which wear slowly and evenly and which give rapid and even dissipation of heat even through relatively thick plastic bodies.

The coefficients of thermal conductivity of most plastics are very low. They range in units of B.t.u. per hour per degree Fahrenheit per square foot area per inch of thickness from 0.9 for chlorinated polyethers to 1.78 for nylon 6/6. By contrast, the coefficient for porcelain is 4 to 5 and for 304 stainless steel it is 112. Experiments have shown that for plastics a critical value for such coefficient is 8; above this value, the heat generated by normal friction is dissipated through the plastic as fast as it is generated; below this value, localized hot spots develop on the plastic surface and eventually the temperature rises high enough to melt off an exceedingly thin layer. A fresh plastic surface is thereby exposed to further wear and the process is repeated. In a comparative test, a small gear made of nylon (Du Pont Zytel 101) was operated under load and wore out in less than 12 hours time. A corresponding gear containing my new polymerized pitch and a substantial amount of metal powder was similarly tested and was in excellent condition after more than one month of continuous operation. Another important result of rendering such plastics much more thermally conductive is the fact that it makes it feasible to extrude and injection mold quite thick articles. Extruders and injection molding machines have been limited in their ability to produce thick walled articles at a high rate of speed; thus, a plastic rod 3 inches in diameter may normally be extruded at only an extremely low rate of speed to allow for proper dissipation of heat. The outer portions naturally solidify first, and as the solidification progresses toward the center of the article the heat of solidification may raise the central portion to a very high temperature producing "scorch" and weakening the structure of the plastic article. When powdered metals are incorporated in the plastic composition in accordance with the present invention it now becomes feasible to produce large molded articles such as automobile fenders at a much more rapid rate.

Electroplating

Plastics containing my new polymerized pitch ingredient are much more suitable for electroplating than plastics previously available. As indicated in the annexed flow diagram, the plastic composition may also desirably include a substantial amount of powdered metal but this is not essential to platability.

As previously indicated it appears that when a plastic composition in accordance with the present invention is molded, as by injection molding, the extreme outer surface portion or skin of the molded article is found to have a relatively high pitch content which much facilitates the subsequent plating operation. The molded article is first repeatedly immersed in a boiling saturated inorganic salt solution in water. The salt may for example be sodium chloride, aluminum chloride, ferrous chloride and ferric chloride, or any combination thereof. The molded article may thus be immersed for three separate 5 minute periods, being allowed to cool a little below 212° F. each time it is removed from the bath. When this occurs, the steam present inside the minute pores in the surface of the molded plastic article condenses with the resultant vacuum being effective to draw in a small amount of the salt solution from the wet surface. The article is then allowed to cool and is washed in water. This provides an excellent platable surface which need not be roughened in the manner of known prior art procedures. While it is desirable that the salt solution be thus saturated and boiling to obtain a high treating temperature, it will be understood that a concentrated salt solution somewhat below its boiling point may instead be employed with generally comparable results.

A conventional pre-plating process may next be employed. It serves to deposit a highly conductive metal film on the plastic surface, preparing it for subsequent electroplating. Normally, following the above salt bath treatment, the molded plastic article is first cleaned by immersion in a hot acid bath, washed, and then chemically etched. An alkaline bath next follows to neutralize any excess acid remaining on the article. The etched surface is now seeded with a tin and palladium mixture and a commercially available "accelerator" may desirably be applied. The article is now immersed in an electroless plating bath for a few minutes, such bath containing 2 parts by weight of nickel salt to 1 part by weight of copper salt. A very thin copper-nickel coating (usually from about $\frac{1}{10}$ to $\frac{1}{100}$ of a mil in thickness) is deposited on such surface. The coated article may now be electroplated in the usual manner.

A more detailed description of a preferred procedure follows:

A conventional coal tar was obtained from a battery of Semet-Solvay by-product coke ovens operated at Ironton, Ohio, by the Solvay Process Division of Allied Chemical Corporation. Similar samples of coal tar were investigated from a number of Semet-Solvay by-product coke ovens located in various parts of the United States and Canada, and coal tars were also investigated from a number of Koppers-Becker by-product coke ovens. All these samples of coal tar were essentially equally satisfactory as a starting material for carrying out the invention.

The coals used to charge the Ironton, Ohio, coke ovens were a mixture of eastern Kentucky coals (E. Ky., Floyd, and Pike) and Cambria County, Pa. coals from the lower Kittaning and Freeport seams. Average analyses of the physical characteristics of these coals are all described in detail in the textbook, "Combustion Engineering" by Otto Lorenzi, pages 2–15, 1st ed. (1957) published by Combustion Engineering, Inc. The Semet-Solvay oven is described in the textbook "Industrial Chemistry, by E. R. Riegel page 250, 3rd ed. (1937) published by Reinhold Publishing Company.

The coal tar from the Semet-Solvay ovens was condensed in the main hydraulic main and overflowed to the decanter along with the ammoniacal liquor. The tar was recovered as a lower layer from the decanter and transported to a de-salting tank. The tar was mixed continuously for an average time of 6 minutes with an equal volume of water in a 1000 gallon tank at 200° F. and then flowed by gravity into the side of a 50,000 gallon tank. The water was recirculated from the top of the tank until the ammonium chloride content became excessive. The lower tar layer was heated to 310° F. by circular coils as it descended to the bottom of the tank. The dry coal tar was continuously withdrawn from the bottom of the tank with a concentration of less than ten pounds of chlorides of ammonia and sodium per one thousand barrels of tar. In this condition the tar is non-corrosive to low carbon steel distillation equipment.

The dry coal tar was charged into a batch still consisting of a horizontal 20,000 gallon tank heated by direct fire with a condenser and vacuum jets attached. The volatiles were rapidly distilled over by bringing the temperature of the tar to about 760° F. at a total pressure at the condenser head of 10 millimeters of mercury absolute. Superheated steam at 1000° F. was used to agitate the coal tar.

As soon as the temperature of the tar reached 760° F., the vacuum was disconnected and the still was pressured with the superheated steam to 100 p.s.i.g. in order to force the hot viscous pitch rapidly out of the batch still.

The hot pitch was above its flash point, and it was forced through a closed system onto a rotating water cooled drum directly beneath the still. A vacuum flaker thereupon quickly cooled and flaked the pitch in a non-oxidizing atmosphere, the pitch being held in such non-oxidizing atmosphere until cooled. The pitch had a softening point of 360° F. by ASTM test E-28.

The pitch was then pulverized in a hammer type mill. No particles larger than 20 mesh size were permitted to pass through the exit screen of the pulverizer.

The pulverized material was then fed into a standard air classifier of the type made by the American Instrument Company of Silver Spring, Md. A centrifugal blower maintained a 4 feet per second upward air velocity and the solids feed rate was 10 pounds per minute per square foot of vertical pipe area. An 85 weight percent yield of product was obtained overhead. The ash content of the resultant pitch was less than 1 weight percent by ASTM method D-482-46.

A portion of the powdered pitch was now added to a steam jacketed Baker-Perkins tumbler mixer along with the following additional ingredients.

| Material: | Weight percent |
|---|---|
| De-ashed pitch powder | 5 |
| Carbon black powder (e.g. "Statex") | 5 |
| Aluminum oxide powder (350 mesh or finer) | 30 |
| Nylon 6/6 pellets (Du Pont Zytel 101) | 57 |
| Teflon 7 powder (Du Pont Tetrafluoroethylene 350 mesh or finer) | 3 |

In addition to the above ingredients, cobalt naphthenate powder was now added at the rate of 150 parts per million parts by weight of the prepared pitch, and powdered mixed tocopherols (effective as antioxidant) were added at the rate of 10 parts per million parts by weight of the pitch.

The tumbler mixer was operated for 10 minutes at 200° F. The powders all uniformly coated the pellets due to the somewhat tacky condition of the powdered pitch and a uniform composition resulted.

The uniformly coated pellets were then fed to several different types of injection molding machines and extruders in order to determine their suitability for processing the reinforced plastics into articles suitable for structural plastics or for subsequent electroplating. It will be appreciated that Teflon is ordinarily very difficult to incorporate with nylon but desirable in that it lowers the coefficient of friction of the final composite product.

It was found that a vertical feed mixer was desirable to cause steady automatic flow of the coated pellets as the pellets were not automatically free-flowing and bridging or arching may otherwise occur in the hopper just over the screw. A vibrating vertical feeder may likewise be employed.

A Kelly Duplex vertical feed mixer manufactured by the Duplex Mill and Manufacturing Company of Springfield, Ohio, was thus successfully used with a horizontal screw extruder machine manufactured by the Beloit Corporation of Downington, Pa. This same Kelly Duplex vertical feeder also worked very well with a horizontal Farrel reciprocating-screw machine manufactured by the USM Corporation of Rochester, N.Y., without encountering such bridging problem.

No vertical feeder was required when using a vertical injection molding machine made by Passadena Hydraulics, Inc. of Brea, Calif., or when using a vertical injection molding machine made by the Vimm Corporation of Boylston, Mass.

Also, no vertical feed mixer was required when using a twin screw extruder manufactured by Welding Engineers, Inc. of Norristown, Pa. It was found that the twin screw machine could extrude the reinforced plastic at over twice the maximum speed possible when using a feed of pellets of pure nylon 6/6 (Du Pont Zytel 101). The same result was observed when using a twin-screw extruder made by C. Tennant, Sons and Company of Carlstadt, N.J.

In all such cases, the extruder was operated at a barrel pressure in excess of 1800 p.s.i., and the center zone temperature of the barrel was approximately 480° F. The screw was run at the maximum speed permitted by the motor drive, and all molds were water cooled. The breaker plate and all breaker plate screens were removed as the low interfacial tension of the de-ashed pitch fully homogenized all components of the reinforced plastic and rendered the screens entirely unnecessary. The possibility of clogging such breaker plate and screen was also thus avoided.

The work was repeated for five additional reinforced plastics. The results of physical and electrical tests are shown in Tables No. 1 and 2 respectively. In the headings of Table No. 1 the percentages of the various components are given by weight. The "Prepared Pitch" is, of course, the polycyclic hydrocarbon pitch prepared in accordance with this invention. The catalysts and anti-oxidants are utilized in such small amounts that no percentage figures are given for these. Nylon is a well-known polyamide resin and Teflon is a tetrafluoroethylene resin. Delrin is an acetal resin. In all tables, including Tables No. 2 and 3, the identical compositions are identified by the same roman numerals, the percentages of the various constituents, however, including the Prepared Pitch, being set forth only in Table No. 1.

Samples of all six of these reinforced plastics were electroplated. The preplate process carried out was as follows:

First, each extruded plastic article was immersed for 5 minutes in a boiling saturated sodium chloride solution. The salt solution temperature was about 269° F. The plastic article was then withdrawn from the boiling liquid for 5 minutes, during which time the surface of the wet plastic reached a temperature below 212° F. This surface temperature was measured by a very small thermocouple. While a saturated sodium chloride solution in water is preferred, other inorganic water soluble salts such as potassium chloride, calcium chloride, magnesium chloride, barium chloride, ferrous chloride, ferric chloride, and aluminum chloride may be employed. A high boiling point below the melting point of the particular plastic article is desired.

The immersion in the boiling salt solution and the subsequent surface cooling of the plastic was repeated twice again. This was done to cause a small amount of the salt solution to enter the minute pores of the surface and apparently bond with the polymerized pitch. A slight change in the surface texture may be noted. It was reported by Marcusson in "Chemische Zeitung," volume 42, page 437 (1918) that pitches form rather stable double complexes with ferric chloride. However, it was not previously realized that a partially polymerized prepared pitch could be used to provide an excellent platable surface in essentially any plastic containing the same after the above treatment in a boiling salt solution.

Following the above treatment, each plastic article was cooled and washed with water.

The prepared plastic samples were then placed on a moving rack in a continuous commercial pre-plating process conventionally employed for preparing articles of ABS plastic for subsequent electroplating.

Each plastic article was immersed in conventional manner for about 6 minutes in an aqueous chromate solution (e.g. approx. 3% potassium dichromate and approx. 10% by weight of sulphuric acid) at 140° F. The concentration of chromate and sulfuric acid is less important than the bath temperature and time of immersion. The acid concentration weakens with use, so temperature and time of immersion must be continually judged by the operator from the results of the preceding treatment.

After etching the plastic surfaces in the acid bath, the plastic articles were each rinsed in 5 baths of deionized water containing a basic neutralizer such as ammonium hydroxide to remove excess acid constituents of the acid etch.

TABLE 1

| | I | II | III | IV | V | VI | Nylon 6/6 (Zytel 101) | Delrin (150) | Teflon 7 |
|---|---|---|---|---|---|---|---|---|---|
| Plastic composition | | | | | | | | | |
| Nylon 6/6 | 57 | | 57 | 70 | | | | | |
| Delrin 150 | | 57 | | | 37 | 70 | | | |
| Powdered aluminum oxide | 30 | 30 | | | | | | | |
| Powdered metal | | | | 20 | | 20 | | | |
| 10 angstrom size carbon | | | 30 | | 50 | | | | |
| Carbon | 5 | 5 | | 10 | | 10 | | | |
| Teflon 7 | 3 | 3 | 5 | 5 | 5 | 5 | | | |
| Prepared pitch | 5 | 5 | 3 | 3 | 3 | 3 | | | |
|   | | | 5 | | 5 | | | | |
| Total percent | 100 | 100 | 100 | 100 | 100 | 100 | | | |
| Ultimate tensile strength; p.s.i. at 0.2 in./min. crosshead speed, ASTM-D-638 | 10,800 | 9,000 | 13,100 | 10,400 | 9,100 | 8,400 | 11,800 | 10,000 | 3,800 |
| Ultimate elongation, percent at 0.2 in./min. crosshead speed Type 1 specimen, ⅛ inch ASTM-D-638 | 15 | 6 | 60 | 10 | 15 | 4 | 230 | 75 | 350 |
| Flexural strength; p.s.i. at yield, ASTM-D-790 | 19,000 | 19,400 | 13,500 | 19,300 | 13,900 | 19,200 | 12,700 | 14,100 | (¹) |
| Impact strength; Izod notched; ft.lbs./inch ¼ inch by ¼ inch ASTM-D-256 | 1.2 | 2.2 | 0.9 | 1.3 | 2.4 | 2.8 | 0.9 | 2.3 | 2.9 |
| Tensile impact strength; ft.lbs./sq.in. ASTM-D-1022: | | | | | | | | | |
|   Type S | 225 | 230 | 210 | 230 | 225 | 250 | 200 | 220 | 190 |
|   Type L | 370 | 380 | 355 | 390 | 355 | 395 | 340 | 350 | 320 |
| Modulus of Elasticity: | | | | | | | | | |
|   Tension, p.s.i. | 335,000 | 340,000 | 320,000 | 340,000 | 340,000 | 340,0000 | 330,000 | 320,000 | 95,000 |
|   Flexure, p.s.i. | 405,000 | 415,000 | 400,000 | 410,000 | 415,000 | 410,000 | 316,000 | 410,000 | 70,000 |
| Compressive stress, ASTM-D-695: | | | | | | | | | |
|   At 1% deformation, p.s.i. at 73° F | 7,000 | 7,800 | 3,000 | 7,200 | 5,800 | 8,000 | 2,900 | 5,200 | 600 |
|   At rupture or yield, p.s.i. at 73° F | 17,000 | 19,200 | 13,000 | 17,800 | 19,000 | 19,800 | 11,000 | 18,000 | 2,500 |
| Heat distortion temperature: | | | | | | | | | |
|   At 66 p.s.i.° F, ASTM-D-648 | 380 | 360 | 360 | 390 | 345 | 370 | 360 | 340 | 250 |
|   At 264 p.s.i.° F, ASTM-D-648 | 245 | 270 | 190 | 255 | 260 | 265 | 150 | 225 | 120 |
| Creep; 300 hours at 3,000 p.s.i. at 73° F, ASTM-D-674 | 1.2 | 0.9 | 5.9 | 0.6 | 1.9 | 0.6 | 6.0 | 2.1 | (¹) |
| Deformation under load; ASTM-D-621 at 2,000 p.s.i., 50° C., 24 hours, percent | 0.2 / 1.9 | 0.2 / 0.4 | 1.4 / 2.6 | 0.1 / 1.3 | 0.4 / 0.6 | 0.1 / 0.2 | 1.4 / 8.0 | 0.5 / 0.9 | 25.0 / 0.10 |
| Water absorption; ASTM-D-570, 7 days at 73° F | 1.30 | 1.60 | 1.13 | 2.21 | 1.40 | 2.28 | 1.13 | 1.43 | 2.13 |
| Specific gravity; ASTM-D-758 | 119 | 123 | 118 | 130 | 123 | 130 | 117 | 120 | 98 |
| Hardness, Rockwell R. scale ASTM-D-785 | | | | | | | | | |
| Abrasion loss; Taber abraser (1,000 grams load C7-17 wheel) mg./1,000 cycles, ASTM-D-1044 | 10 | 13 | 14 | 4 | 16 | 4 | 14 | 20 | (¹) |
| Coefficient of friction; ASTM-D-1894: | | | | | | | | | |
|   Static | 0.08 | 0.08 | 0.23 | 0.08 | 0.28 | 0.08 | 0.23 | 0.30 | 0.04 |
|   Kinetic | 0.05 | 0.05 | 0.18 | 0.05 | 0.25 | 0.05 | 0.18 | 0.28 | 0.04 |
| Thermal conductivity; ASTM-C-117-45 Btu/(hour) (sq. ft.) (° F.)/inch | 2.05 | 2.01 | 1.40 | 4.95 | 1.70 | 4.95 | 1.62 | 1.60 | 1.74 |

¹ Too soft.

NOTE.—All samples after molding were held for 72 hours in air at 50 percent relative humidity at 72° F. before testing. Results are not the same as for "as molded" samples in some cases.

The plastic articles were then immersed for one minute at room temperature in a bath containing a solution of palladium and tin salts in denionized water. The etched surfaces and presumably the bonded sodium chloride were thus sensitized or "seeded" with the inactive palladium. The plastic articles were then immersed for one minute at room temperature in an accelerator or activator bath to bond a thin metallic film on the plastic and to catalyze the deposition of metal in the subsequent bath. The thickness of the metallic film deposited was about 10 to 30 millionths of an inch.

The plastic articles were next immersed for about 4 minutes in a bath containing 2 parts ammoniacal copper and 1 part ammoniacal nickel salts by weight. The electroless plating occurred autocatalytically at room temperature and deposited the copper-nickel film by reduction of the ammonium salt. The surfaces were thus made conductive for subsequent electroplating.

The electroless plated plastic articles were then immersed for 3 minutes in a standard dull acid copper-nickel bath and then electroplated with 1 mil thickness of copper-nickel in a bright acid copper-nickel bath. It will be understood that the electroless plating and subsequent electroplating operations are conventional such as are presently commercially employed in the plating of ABS plastic articles and do not per se constitute a part of the present invention. I have, however, much facilitated such plating operations by the incorporation of my new partially polymerized prepared pitch in the plastic and the subsequent salt treatment thereof prior to performance of such plating operations. The plating is much more firmly bonded and it has been made possible thus to plate articles of various plastics (e.g. nylon) where it was previously impossible or not commercially feasible to do so.

Reference may be had to Table No. 3 which indicates the properties of the same six electroplated extruded plastic bars prepared as above described. This table clearly indicates the advantages achieved in accordance with the present invention.

TABLE 2.—ELECTRICAL PROPERTIES OF PLASTIC BARS

| Electrical properties | Plastic composition | | | | | | | | |
|---|---|---|---|---|---|---|---|---|---|
| | I | II | III | IV | V | VI | Nylon 6/6 (Zytel 101) | Delrin (150) | Teflon (7) |
| | Nylon 6/6 [1] | Delrin 150 [1] | Nylon 6/6 [2] | Nylon 6/6 [3] | Delrin 150 [2] | Delrin 150 [3] | | | |
| Dielectric strength, short time, ⅛ inch thickness; volts per mil ASTM-D-149-61 as molded | 490 | 540 | 500 | 470 | 550 | 520 | 440 | 500 | 480 |
| Dielectric strength, step-by-step, ⅛ inch thickness; volts per mil ASTM-D-149-61 as molded | 440 | 460 | 475 | 420 | 480 | 420 | 390 | 400 | 430 |
| Dielectric constant, ASTM-D-150-59T; as molded at— | | | | | | | | | |
| 60 cycles | 3.6 | 3.3 | 2.8 | 4.0 | 2.7 | 3.7 | 3.9 | 3.7 | 2.1 |
| 1 kc | 3.6 | 3.3 | 2.8 | 3.9 | 2.7 | 3.7 | 3.9 | 3.7 | 2.0 |
| 1 mc | 3.4 | 3.3 | 2.5 | 3.8 | 2.7 | 3.5 | 3.7 | 3.7 | 2.1 |
| X-band | 3.7 | 3.6 | 2.9 | 4.2 | 2.9 | 4.0 | 4.0 | 3.9 | 2.3 |
| Dissipation (power) factor ASTM-D-59T; as molded at— | | | | | | | | | |
| 60 cycles | 0.030 | 0.020 | 0.008 | 0.080 | 0.002 | 0.070 | 0.020 | 0.003 | 0.0002 |
| 1 kc | 0.030 | 0.020 | 0.008 | 0.070 | 0.002 | 0.070 | 0.020 | 0.003 | 0.0002 |
| 1 mc | 0.038 | 0.030 | 0.007 | 0.070 | 0.003 | 0.060 | 0.040 | 0.004 | 0.0002 |
| X-band | 0.060 | 0.050 | 0.010 | 0.090 | 0.006 | 0.090 | 0.070 | 0.010 | 0.0004 |

[1] Containing powdered aluminum oxide and carbon plus 3% Teflon 7.
[2] Containing 10 angstrom size carbon.
[3] Containing powdered metal and carbon plus 3% Teflon 7.

TABLE 3.—MECHANICAL PROPERTIES OF ELECTROPLATED PLASTIC BARS
[Plating was 0.0005-inch composed of two parts copper plus one part nickel; and 0.0015-inch of hard steel containing 7% chromium and 1% molybdenum]

| Mechanical properties | Plastic composition | | | | | |
|---|---|---|---|---|---|---|
| | Nylon 6/6 [1] | Delrin 150 [1] | Nylon 6/6 [2] | Nylon 6/6 [3] | Delrin 150 [2] | Delrin 150 [3] |
| Ultimate tensile strength; p.s.i. at 0.2 in./min. crosshead speed, Type 1 specimen, ⅛-inch ASTM-D-638 | 16,200 | 13,700 | 19,900 | 15,800 | 13,800 | 12,600 |
| Ultimate elongation, percent at 0.2 in./min. crosshead speed, Type 1 specimen, ⅛-inch, ASTM-D-638 | 1.3 | 1.2 | 1.5 | 1.3 | 1.4 | 1.2 |
| Flexural strength; p.s.i. at yield, ASTM-D-790 | >20,000 | >20,000 | >20,000 | >20,000 | >20,000 | >20,000 |
| Impact strength; Izod notched, ft. lbs./inch ¼ inch by ¼ inch ASTM-D-256 | (4) | (4) | (4) | (4) | (4) | (4) |
| Tensile impact strength; ft. lbs./sq. in. ASTM-D-1022: | | | | | | |
| Type S | >1,000 | >1,000 | >1,000 | >1,000 | >1,000 | >1,000 |
| Type L | >1,000 | >1,000 | >1,000 | >1,000 | >1,000 | >1,000 |
| Modulus of elasticity: | | | | | | |
| Tension, p.s.i. | 1,200,000 | 1,200,000 | 1,100,000 | 1,200,000 | 1,100,000 | 1,200,000 |
| Flexure, p.s.i. | 1,700,000 | 1,700,000 | 1,550,000 | 1,600,000 | 1,700,000 | 1,650,000 |
| Compressive stress; ASTM-D-695: | | | | | | |
| At 1% deformation, p.s.i. at 73° F | 8,000 | 8,900 | 3,900 | 8,300 | 6,700 | 9,000 |
| At rupture or yield, p.s.i. at 73° F | 21,000 | >22,000 | 17,000 | 22,000 | >22,000 | >22,000 |
| Heat distortion temperature; ASTM-D-648 | | | | | | |
| At 66 p.s.i., ° F | >700 | >700 | >700 | >700 | >700 | >700 |
| At 264 p.s.i., ° F | >700 | >700 | >700 | >700 | >700 | >700 |
| Creep, 300 hours at 3,000 p.s.i.; at 73° F., percent ASTM-D-674 | <0.1 | <0.1 | <0.1 | <0.1 | <0.1 | <0.1 |
| Deformation under load, ASTM-D-621 at 2,000 p.s.i., 50° C., 24 hours, percent | Nil | Nil | Nil | Nil | Nil | Nil |
| Water absorption; ASTM-D-570 7 days at 73° F | Nil | Nil | Nil | Nil | Nil | Nil |
| Specific gravity; ASTM-D-792 | 1.35 | 1.64 | 1.19 | 2.24 | 1.45 | 2.31 |
| Hardness, Rockwell B scale; [5] ASTM-D-785 | 85 | 88 | 84 | 92 | 87 | 92 |
| Abrasion loss; Taber abraser (100 grams load C7-17 wheel) mg./1,000 cycles ASTM-D-1044 | Nil | Nil | Nil | Nil | Nil | Nil |

See footnotes at end of table.

TABLE 3.—MECHANICAL PROPERTIES OF ELECTROPLATED PLASTIC BARS—Continued

[Plating was 0.0005-inch composed of two parts copper plus one part nickel; and 0.0015-inch of hard steel containing 7% chromium and 1% molybdenum]

| Mechanical properties | Plastic composition | | | | | |
|---|---|---|---|---|---|---|
| | Nylon 6/6 [1] | Delrin 150 [1] | Nylon 6/6 [2] | Nylon 6/6 [3] | Delrin 150 [2] | Delrin 150 [3] |
| Coefficient of friction; ASTM-D-1894: | | | | | | |
| Static | 0.13 | 0.13 | 0.13 | 0.13 | 0.13 | 0.13 |
| Kinetic | 0.11 | 0.11 | 0.11 | 0.11 | 0.11 | 0.11 |
| Thermal conductivity; ASTM-C-177-45 B.t.u./(hour) (sq. ft.) (° F.)/inch | 3.03 | 2.99 | 2.69 | 5.93 | 2.67 | 5.90 |
| Plate adhesion; lbs./inch ASTM-D-1004-66 | 620 | 570 | 240 | 1,050 | 210 | 1,000 |

[1] Containing powdered aluminum oxide and carbon plus 3% Teflon No. 7.
[2] Containing 10 angstrom size carbon.
[3] Containing powdered metal and carbon plus 3% Teflon No. 7.
[4] No break.
[5] Materials were too hard for R scale testing.

I therefore particularly point out and distinctly claim as my invention:

1. A plastics composition comprising in intimate mixture at least one plastic polymer selected from the class consisting of polyamides, polycarbonates, polyacetals, polytetrafluoroethylenes, polyethylenes, polypropylenes, polyvinylchlorides, polyacrylates, epoxy resins, and mixtures thereof, from about 3 to about 30% of a pitch, based on the weight of the mixture, the pitch containing less than about 50 pounds of halides per 1,000 barrels of pitch and having an ash content of less than about 5% by weight and an asphaltene content of from about 8 to about 100 percent by weight, and a softening temperature above 320° F. by the ASTM ring and ball method, and a catalytic amount of a polymerization catalyst selected from the class consisting of cobalt naphthenate, barium naphthenate, calcium naphthenate and strontium naphthenate for said pitch.

2. The composition of claim 1, wherein said catalyst is cobalt naphthenate.

3. The composition of claim 1, wherein said pitch has a softening temperature of at least 360° F.

4. The composition of claim 1, wherein there is also included up to about 10 parts per million based on the weight of the pitch of an anti-oxidant.

5. The composition of claim 1, wherein there are a plurality of normally physically incompatible thermoplastic polymers rendered substantially homogeneous and compatible by the inclusion of said pitch and catalyst.

6. The composition of claim 1, including up to about 55% by weight of an inert filler.

7. The composition of claim 6, wherein said filler is powdered metal.

8. The composition of claim 1, wherein said filler is powdered iron oxide.

9. The composition of claim 1, wherein said softening temperature is at least 340° F., said catalyst is cobalt naphthenate, and up to about 20% by weight of finely divided carbon is included in said mixture.

10. The composition of claim 5, including both nylon and tetrafluoroethylene.

11. A plastics composition comprising a plastic polymer selected from the class consisting of polyamides, polycarbonates, polyacetals, polytetrafluoroethylenes, polyethylenes, polypropylenes, polyvinylchlorides, polyacrylates, epoxy resins, and mixtures thereof, from about 3 to about 30% by weight based on the weight of the mixture of a finely divided complex polycyclic hydrocarbon pitch at least partially polymerized containing less than about 50 pounds of halides per 1,000 barrels of pitch and having an ash content of less than about 5% by weight of an asphaltene content of from about 8 to about 100 percent by weight, and said pitch having an interfacial tension of less than 30 dynes/cm. with said polymer in the liquid phase as calculated from readings of the Du Nouy tensiometer.

12. The article of claim 1, having up to about 55% by weight of a finely divided conductive powder uniformly incorporated therein.

13. The article of claim 1, having a relatively high concentration of said polymerized pitch in a thin surface layer of said article.

14. A plastics composition comprising a plastic polymer selected from the class consisting of polyamides, polycarbonates, polyacetals, polytetrafluoroethylenes, polyethylenes, polypropylenes, polyvinylchloride, polyacrylates, epoxy resins, and mixtures thereof, from about 3 to about 30 percent based on the weight of the mixture of a polymerized pitch, said pitch prior to such polymerization having a softening point above 320° F. by the ASTM ring and ball method and after such polymerization having an interfacial tension with said plastic polymer in the liquid phase of less than 30 dynes/cm. as calculated from readings of the Du Nouy tensiometer, and a catalytic amount of cobalt naphthenate as polymerization initiator for said pitch, said pitch containing less than 50 pounds of halides per 1,000 barrels and having an ash content of less than about 5% by weight and an asphaltene content of from about 8 to about 100 percent by weight.

15. A plastics composition comprising in intimate mixture, a plastic polymer selected from the class consisting of polyamides, polycarbonates, polyacetals, polytetrafluoroethylenes, polyethylenes, polypropylenes, polyvinylchlorides, polyacrylates, epoxy resins, phenolic resins, and mixtures thereof, a polymerized pitch containing less than 50 pounds of halides per 1,000 barrels of pitch and having an ash content of less than about 5% by weight and an asphaltene content of from about 8 to about 100 percent by weight, and a catalytic amount of cobalt naphthenate, up to about 10 parts per million based on the weight of the pitch of tocopherol, up to about 55 percent by weight of an inert discrete filler which is uniformly distributed in said composition, said pitch material having an interfacial tension of less than 30 dynes/cm. with said polymer in the liquid phase as calculated from readings of the Du Nouy tensiometer.

16. The plastics composition of claim 1 wherein the composition also contains up to about 10 parts per million based on the weight of the pitch of tocopherol or butylated hydroxy anisol.

17. A molded plastic article comprising in intimate mixture, a plastic polymer selected from the class consisting of polyamides, polycarbonates, polyacetals, polytetrafluoroethylenes, polyethylenes, polypropylenes, polyvinylchlorides, polyacrylates, epoxy resins and mixtures thereof and from about 3 to about 30 percent by weight of a polymerized complex polycyclic hydrocarbon pitch containing less than about 50 pounds of halides per 1,000 barrels of pitch and having an ash content of less than about 5% by weight and an asphaltene content of from about 8 to about 100 percent by weight.

18. The article of claim 17 containing up to about 55 percent by weight of a finely divided conductive powder uniformly incorporated therein.

References Cited

UNITED STATES PATENTS 2,928,753   3/1960   Schmitt _____ 106—269

MORRIS LIEBMAN, Primary Examiner

S. L. FOX, Assistant Examiner

U.S. Cl. X.R.

106—273 R; 208—44; 260—28.5 R, 28.5 AS